(12) United States Patent
Chou (10) Patent No.: US 9,110,811 B2
(45) Date of Patent: Aug. 18, 2015

(54) PREFETCHING METHOD AND APPARATUS

(71) Applicant: Oracle International Corporation, Redwood City, CA (US)

(72) Inventor: Yuan C. Chou, Los Gatos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 248 days.

(21) Appl. No.: 13/622,069

(22) Filed: Sep. 18, 2012

(65) Prior Publication Data
US 2014/0082286 A1    Mar. 20, 2014

(51) Int. Cl.
G06F 12/00    (2006.01)
G06F 12/08    (2006.01)

(52) U.S. Cl.
CPC .................. G06F 12/0862 (2013.01)

(58) Field of Classification Search
CPC .................................................. G06F 12/0862
USPC ................................................. 711/122, 137
See application file for complete search history.

(56) References Cited

U.S. PATENT DOCUMENTS

| | | | |
|---|---|---|---|
| 5,781,926 A * | 7/1998 | Gaskins et al. | 711/145 |
| 6,571,318 B1 * | 5/2003 | Sander et al. | 711/137 |
| 7,529,753 B1 * | 5/2009 | Ewing | 1/1 |
| 8,291,172 B2 | 10/2012 | Hooker et al. | |
| 8,316,188 B2 | 11/2012 | Kadambi et al. | |
| 2003/0056066 A1 * | 3/2003 | Chaudhry et al. | 711/154 |

* cited by examiner

*Primary Examiner* — Larry Mackall
(74) *Attorney, Agent, or Firm* — Meyertons Hood Kivlin Kowert & Goetzel; Erik A. Heter (57) ABSTRACT

A method and apparatus for determining data to be prefetched based on previous cache miss history is disclosed. In one embodiment, a processor includes a first cache memory and a controller circuit. The controller circuit is configured to load data from a first address into the first cache memory responsive to a cache miss corresponding to the first address. The controller circuit is further configured to determine, responsive to a cache miss for the first address, if a previous cache miss occurred at a second address. Responsive to determining that the previous cache miss occurred at the second address, the controller circuit is configured to load data from a second address into the first cache.

18 Claims, 6 Drawing Sheets

Fig. 1

Cache Line 22:

| Tag | Data | Dirty | NLA |
|---|---|---|---|

Cache Line 24:

| Tag | Data | Dirty | History Bits |
|---|---|---|---|

RMAB Entry 26:

| Miss Line Address | Cache Set/Way | Time Stamp |
|---|---|---|

PREFETCHING METHOD AND APPARATUS

BACKGROUND

1. Technical Field

This disclosure relates to computer systems, and more particularly to prefetching memory contents in a cache subsystem.

2. Description of the Related Art

Processors in computer systems rely on cache memories to support desired performance levels. With increasing demands for higher performance, a corresponding increase in the number and capacity of cache memories in a processor has followed. Many processors include multiple levels of cache, including a level one (L1) cache and a level two (L2) cache, with many processor also including a level three (L3). The L1 cache may be the closets to the execution unit(s) of a processor, and in some cases may be divided into separate instruction and data caches. The L2 cache may be the next closest after the L1 cache, with the L3 cache further from the execution unit(s) than the L2 cache. The L2 and L3 caches in many processors are unified caches, storing both instructions and data. At each succeeding level, the caches may become larger. Thus, an L2 cache may be larger than an L1 cache, while an L3 cache may be larger than an L2 cache.

One method of loading a cache memory is in response to a cache miss, i.e. when requested information is not found in the cache. However, cache misses incur a performance penalty which can be significant. Accordingly, many processors perform prefetching to load caches. Prefetching involves the speculative loading of information into the cache with the expectation that the prefetched information is likely to be used. Various types of prefetching may be performed. One type of prefetching is known as stride prefetching, wherein data is loaded from fixed address intervals. Another type of prefetching is known as next line prefetching, wherein an adjacent second line of data is automatically loaded into the cache responsive to the loading of a first line of data.

SUMMARY OF THE DISCLOSURE

A method and apparatus for determining data to be prefetched based on previous cache miss history is disclosed. In one embodiment, a processor includes a first cache memory and a controller circuit. The controller circuit is configured to load data from a first address into the first cache memory responsive to a cache miss corresponding to the first address. The controller circuit is further configured to determine, responsive to a cache miss for a first line address, if a previous cache miss occurred at a second address. Responsive to determining that the previous cache miss occurred at the second address, the controller circuit is configured to load data from a second address into the first cache.

In one embodiment, a method includes loading, into a first cache, data from a first memory address responsive to a cache miss corresponding to the first memory address. The method further includes determining, responsive to the cache miss, if a previous cache miss occurred, the previous cache miss corresponding to a second memory address. Responsive to determining that the previous cache miss occurred, data from the second memory address is also loaded into the cache.

BRIEF DESCRIPTION OF THE DRAWINGS

Other aspects of the disclosure will become apparent upon reading the following detailed description and upon reference to the accompanying drawings, which are now briefly described.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION

Figure 1:
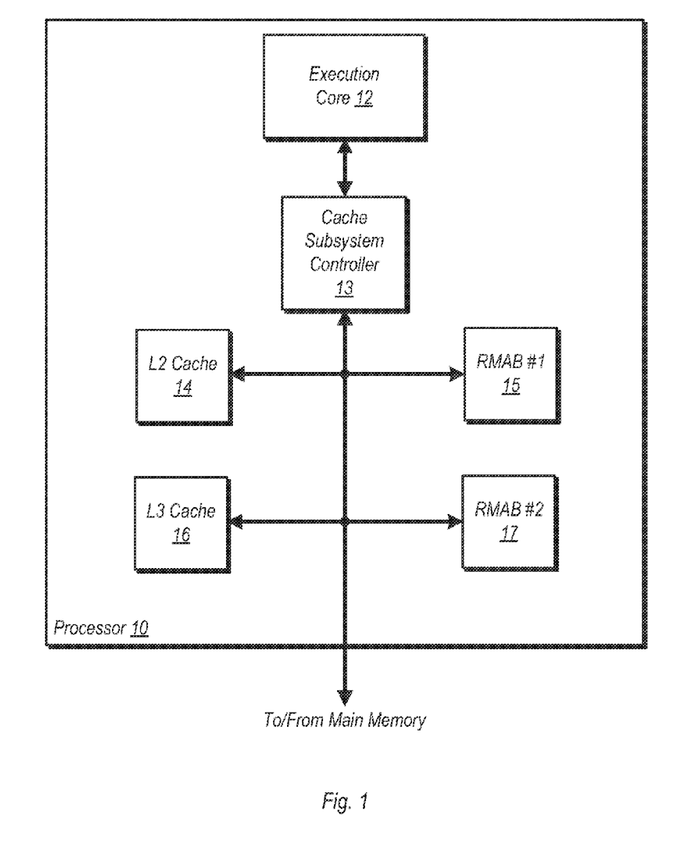
FIG. 1 is a block diagram of one embodiment of a processor having multiple caches.

Turning now to FIG. 1, a block diagram of one embodiment of a processor having multiple caches is shown. In the embodiment shown, processor 10 includes an execution core 12, a cache subsystem controller 13, a level two (L2) cache 14, and a level three (L3) cache 16. Also included in this embodiment of processor 10 is a first recent miss address buffer (RMAB) 15 and a second RMAB 17. RMAB 15 is associated with L2 cache 14, while RMAB 17 is associated with L3 cache 16. It is noted that an RMAB is implemented for those caches that use history-based prefetching, as discussed below. Caches that do not use history-based prefetching may be implemented without implementation of a corresponding RMAB.

Although not explicitly shown, execution core 12 may include at least one level one (L1) cache, and in some embodiments, may include separate L1 caches for data and instructions. Moreover, in various embodiments, processor 10 may include multiple execution cores 12 which may share the L2 and L3 caches. It is also noted that in some embodiments, separate cache controllers may be provided for the various levels of cache memory, although a single instance is shown here for the sake of simplicity. Also not shown here, for the sake of simplicity, is a memory controller, which may be present in various embodiments to provide an interface between processor 10 (and various agents therein, such as execution core 12) and a main memory.

In the embodiment shown, L3 cache 16 may be larger than L2 cache 14. Furthermore, L2 cache 14 may be considered to be a higher-level cache (i.e. logically closer to execution core 12) than L3 cache 16. Moreover, at any given time, L3 cache 16 may store all of the data that is stored in L2 cache 14, as well as additional data not stored in any higher-level cache. For the purposes of this disclosure, the reference to a cache storing 'data' may encompass that same cache also storing instructions, unless explicitly stated otherwise. Accordingly, the information stored in L2 cache 14 and L3 cache 16 may include data as well as instructions for the embodiments discussed herein. It is however noted that embodiments in which separate instructions and data caches are provided in lieu of the unified L2 and L3 caches shown here are possible and contemplated.

Each of RMAB 15 and RMAB 17 in the embodiment shown store information pertaining to recent misses for its respective cache. When a request for data from one of L2 cache 14 or L3 cache 16 results in a cache miss (i.e. the data is not present in the cache receiving the request), the corresponding RMAB may be updated with information regarding the miss concurrent with the requested data being loaded into the various levels of cache memory.

Each of RMAB 15 and RMAB 17 in the embodiment shown is implemented as a first-in, first-out memory (FIFO). Thus, information for a most recent cache miss may be used to overwrite the oldest entry in an RMAB.

Using information in RMABs 15 and 17, as well as additional information stored in each entry of the cache, cache subsystem controller 13 may perform history-based prefetching. More particularly, each RMAB may be used to determine if a memory address of a current miss is adjacent to or within a specified address range of addresses with respect to the address of another recent miss. Based on the results of such a determination, history bits associated with one or more cache lines may be updated. The history bits may be consulted on future cache misses to determine if addresses adjacent to or nearby the address of a current miss are to be prefetched. Thus, instead of automatically prefetching data from certain memory addresses (such as in, e.g., stride prefetching or automatic next line prefetching), cache subsystem controller 13 may perform prefetching based on history of previous cache misses and loads, which may indicate the likelihood that a cache miss for one memory address is indicative that a request for data from another address will also be requested.

When a cache miss occurs in the illustrated embodiment, a number of different actions are performed by cache subsystem controller 13. One action performed responsive to a cache miss is a search of an RMAB for the associated cache. For example, if a miss occurs in L2 cache 14, cache subsystem controller 13 may search RMAB 15 to determine if the address of the current cache miss is the next line address or within a certain range of addresses (depending on the embodiment), of addresses for any of the other entries in RMAB 15. In one embodiment, if the address of the current miss matches the next line address of an address stored in an RMAB entry, cache subsystem controller 13 may set a next line address (NLA) bit associated with the matching RMAB entry. For example, if the current cache miss is at address 0011, and a search of the RMAB locates an entry having address 0010, then cache subsystem controller 13 may set the NLA bit for a cache line storing data from address 0010. Thus, when the NLA bit is set in this example, it indicates that subsequent to the request for data from address 0010, data from the next adjacent address was also requested. As explained in further detail below, this NLA bit may be consulted for a future cache miss for address 0010 to determine if data from address 0011 is to be prefetched.

A second action performed by cache subsystem controller 13 responsive to the cache miss is to store information regarding the cache miss in an RMAB, e.g., in RMAB 15 for a cache miss at L2 cache. As previously noted, each RMAB in the embodiment shown is a FIFO, and thus the information for the current miss may replace the oldest information stored in the RMAB. The replacement of information in the RMAB may occur after the above-mentioned search of the RMAB.

A third action performed by cache subsystem controller 13 responsive to a cache miss is to consult an NLA bit for the address of the miss to determine whether the next address is to be prefetched. In various embodiments, the NLA bit (or more generally, history bits) associated with cached data from a given memory address may be stored in the cache line along with the data, tag, and other information. When a cache miss occurs in such an embodiment, the cache subsystem controller 13 may consult the NLA bit if stored in a lower level cache. For example, if a cache miss occurs in L2 cache 14, cache subsystem controller 13 may search L3 cache 16 to determine if the requested data is stored therein. If the requested data is found in L3 cache 16, in addition to loading the data stored therein into the L2 and L1 caches, the NLA bit stored in the corresponding L3 cache line is examined by cache subsystem controller 13 to determine if it is set. If set, cache subsystem controller 13 may prefetch data from the next adjacent address in memory, loading the data into the various levels of the cache subsystem. If the NLA bit is not set (i.e. in a reset state), no prefetch is performed, and only the data that caused the miss is loaded into the higher level caches.

While the embodiment discussed above utilizes space in cache lines to store the NLA bits, it is noted that embodiments where the NLA bits are stored elsewhere are possible and contemplated. For example, one embodiment is contemplated wherein a separate buffer is provided to store NLA bits. Another embodiment is also contemplated wherein space in main memory is reserved to store NLA bits.

It is further noted that, while the discussion above has been referenced to NLA bits, history-based prefetching as disclosed herein may be extended to multiple address. Generally speaking, the NLA bit is a history bit providing cache miss history for one memory address, i.e. one that is adjacent to the memory address of another cache miss. Additional history bits may be provided for additional memory addresses. For example, one embodiment contemplates providing history bits for N consecutive addresses beginning with the address for data stored in the cache in a sequence increasing addresses. Another embodiment is contemplated wherein history bits are provided for N consecutive addresses prior and up to the address of cached data. Still another embodiment is contemplated wherein history bits are provided for a total of N consecutive addresses, including some addresses prior to that of the cached data and some addresses subsequent to that of the cached data, with the address of the cached data being somewhere between the beginning and ending addresses of the sequence. The value of N is an integer value and may be odd or even.

In general, the method and apparatus embodiments discussed herein contemplate generating and storing history information for one or more addresses and the history-based prefetching of data from those addresses based on cache misses for related addresses. Such history-based prefetching may be implemented in lieu of automatic prefetching performed in some processor embodiments. This in turn may prevent cache pollution by prefetching data that is, based on established history, more likely to be requested. Furthermore, since data that is less likely to be requested is not prefetched, bandwidth consumption by the cache subsystem may be reduced.

Figure 2:
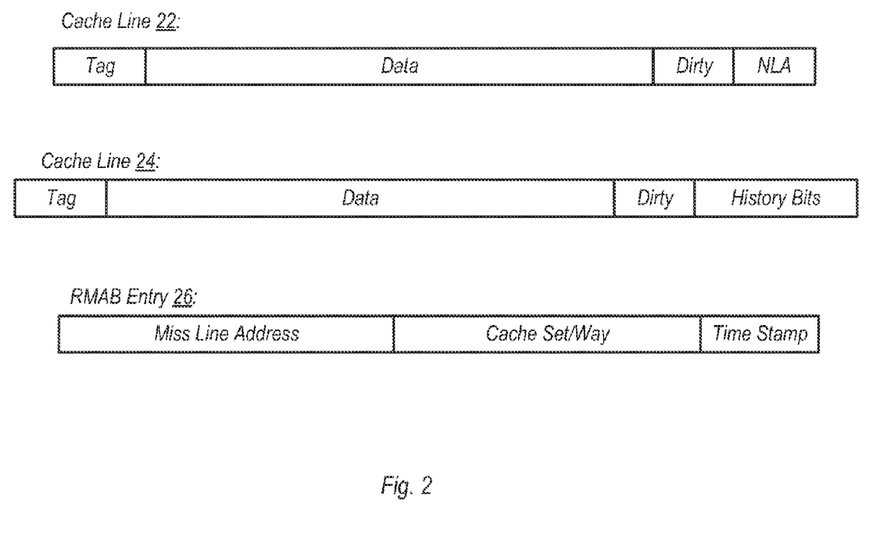
FIG. 2 is a diagram illustrating entry formats for one embodiment of recent miss address buffer and various embodiments of a cache.

FIG. 2 is a diagram illustrating entry formats for one embodiment of RMAB and various embodiments of a cache. More particular, FIG. 2 illustrates two different cache line embodiments and an embodiment of an RMAB entry.

Cache line 22 as shown in FIG. 2 in the embodiment shown includes a tag field, a data field, a dirty bit field, and an NLA bit. The tag includes at least part of the memory address (which may be virtual or physical) in main memory where the data resides. The data field may include the data from that address, unless that data has been modified. If the data has been modified, the dirty bit is set, indicating modification. Otherwise, if reset, the dirty bit indicates that the data in the data field is equivalent to the data stored at the address indicated in the tag field.

The NLA bit in the embodiment shown indicates whether data from a next address (adjacent to the address indicated in the tag field) was requested in a previous cache miss. If set, the data from the next address was a previous cache miss. Thus, if a higher-level cache than the one in which cache line 22 is present misses at the address indicated by the tag, the data from cache line 22 is loaded into the higher-level cache, and the data at the next address is also loaded into the cache as part of a prefetch operation. For example, if data stored in an L2 cache including cache line 22 is requested, the data stored therein is loaded into an L1 cache. Furthermore, if the NLA bit of cache line 22 is set, data from the next address is also loaded into the cache even if it has not otherwise been requested. The NLA bit may be checked by cache subsystem controller 13 responsive to a cache miss for the address indicated by the tag, with the aforementioned prefetching occurring responsive to determining that the NLA bit is set.

The fields of cache line 24 may be similar or alike corresponding fields in cache line 22, with the exception that the history bit field is provided in lieu of the NLA bit field. The history bit may include N bits, wherein each of the N bits is indicative of a prior cache miss at a corresponding address. The addresses represented by the N bits may be consecutive addresses, with at least one of the addresses adjacent to the address indicated in the tag field. A number of examples are now provided to illustrate various possible configurations of the history bits.

In a first example, N=5, with the history bits representing five consecutive addresses beginning with the next address after that indicated in the tag field. In such an example, if cache line 24 is located in one or both of an L2 and/or L3 cache, and a cache miss for the address indicated in the tag field occurs in an L1 cache, data from the cache line is loaded into the L1 cache. Additionally and responsive to the cache miss, cache subsystem controller 13 may check the status of each of the N history bits. For any of the N history bits that are set, data from their respective addresses may be prefetched into the L1 cache if that data is not already present therein. Prefetches are not performed from addresses corresponding to any of the N history bits that are not set.

In a second example, N=6. One of the addresses is an address that is immediately prior to the address indicated in the tag field of cache line 24. The remaining five addresses are consecutive addresses subsequent to the address indicated in the tag field, beginning with the next address. Thus, the six addresses corresponding to the history bits and the address indicated by the tag field thus form a block of seven consecutive addresses. The history bits may be checked in the same manner as described above responsive to a cache miss for the address indicated by the tag field.

A third example is provided where N=7. In the third example, the history bits correspond to the three addresses immediately prior and the four addresses subsequent to the address in the tag field. Thus, the seven addresses corresponding to the history bits and the address indicated by the tag field thus form a block of eight consecutive addresses.

The above examples are not intended to be limiting. On the contrary, in embodiments in which N history bits are provided, the addresses may be arranged in a number of different ways that are not otherwise discussed herein while nevertheless falling within the scope of this disclosure.

RMAB entry 26 shown in FIG. 2 includes three fields: a miss line address field, a cache set/way field, and a time stamp field. The miss line address field indicates the address in main memory of the cache miss. The cache set/way field indicates the set and the way of a corresponding cache into which the data was loaded responsive to the miss. Responsive to a cache miss, cache subsystem controller 13 may search each RMAB for matching entries. An entry in the RMAB is considered to be matching if the memory address of the cache miss is one of the N addresses indicated by the history bits, or the address indicated by the NLA bit (it is noted that the NLA bit embodiments are a special case in which N=1). For example, in an embodiment in which only an NLA bit is checked, a search of the RMAB produces a match when the address of the cache miss corresponds to the next address relative to the miss line address of RMAB entry 26, (i.e. the miss line address+1). Responsive to a match in this case, cache subsystem controller 13 may set the NLA bit in the cache line at the cache set/way indicated in the cache set/way field indicated by RMAB entry 26.

In an embodiment in which multiple history bits are provided (i.e. N>1), a matching entry is one in which the address of the cache miss corresponds to an address within a range of addresses that correspond to one of the N history bits associated with the miss address in RMAB entry 26. For example, in an embodiment where N=2, with one of the addresses being immediately previous and the other being the next address subsequent to the address in the miss line address field, a match occurs when a miss corresponds to either of these addresses. It is further noted that when a miss occurs in embodiments where N>1, a search of an RMAB responsive to a cache miss at a given address may produce multiple matches. Using the N=2 to example, if a cache miss occurs at an address that is immediately prior to the miss line address for one RMAB entry 26 and immediately subsequent to the miss line address for another RMAB entry 26, the RMAB search yields two matching entries. For all entries that result in matches, corresponding history bits may be set in corresponding cache lines.

The time stamp field is an optional field included in some embodiments, but is not otherwise a requirement. The time stamp field indicates when the entry in the RMAB was allocated. In embodiments using the time stamp field, cache subsystem controller may compare the current time to the time stamp in the time stamp field when an RMAB match occurs. If the time indicated by the time stamp is sufficiently far from the current time, cache subsystem controller 13 may set an NLA/history bit responsive to the match. However, if the current time and the time stamp are close together, the cache subsystem controller 13 may leave corresponding NLA/history bits in a reset state despite the match. The determination of whether the time is sufficient may be based on a time threshold, with cache subsystem controller 13 comparing the time difference to the time threshold. This may also reduce bandwidth consumption in the cache subsystem, since misses that are close together in time may not be worth prefetching due to a lack of timeliness.

While the embodiments discussed above are directed to specific storage structures for storing the various history information (e.g., an RMAB storing recent miss information, cache lines being augmented with an NLA bit or history bits), it is noted that these storage structures are not intended to be limiting to the idea of using miss history to determine whether prefetching is to be performed. In contrast, the various methods of using previous miss history described herein may be implemented in a wide variety of hardware embodiments using various types of storage structures. For example, one embodiment is possible and contemplated in which a single buffer is used to store all of the history information that is described above as being stored in the RMAB and NLA/history bit fields of the cache lines.

It is also noted that, in some embodiments, cache subsystem controller 13 may periodically and unconditionally clear all NLA/history bits (i.e. reset all). In some cases, a large number of NLA/history bits will be set over time, and as this number increases, the number of prefetches is also likely to increase. At some point, the number of prefetches occurring responsive to cache misses of related lines can consume enough bandwidth in the cache subsystem that performance may be adversely impacted. Cache pollution can also result. Thus, by periodically clearing all history/NLA bits, instances of excessive bandwidth consumption and cache pollution can be minimized or prevented.

Figure 3:
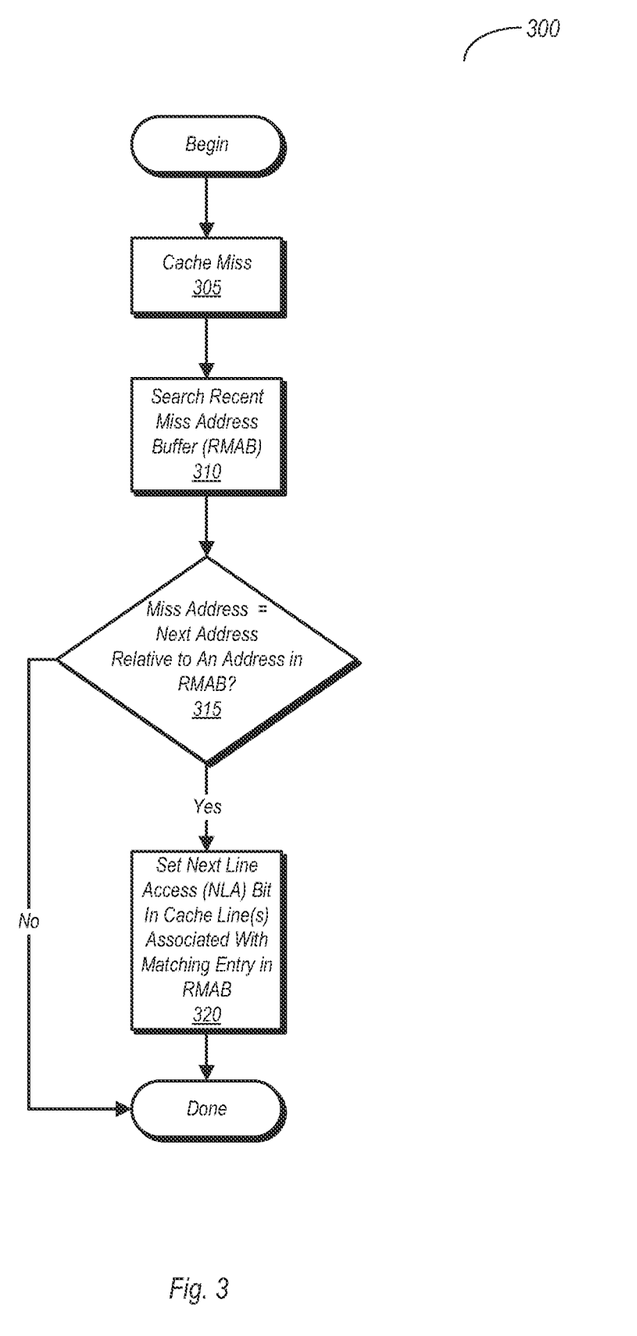
FIG. 3 is a flow diagram illustrating one embodiment of a method for operating a cache subsystem in determining whether a next cache line was a recent miss.
Figure 4:
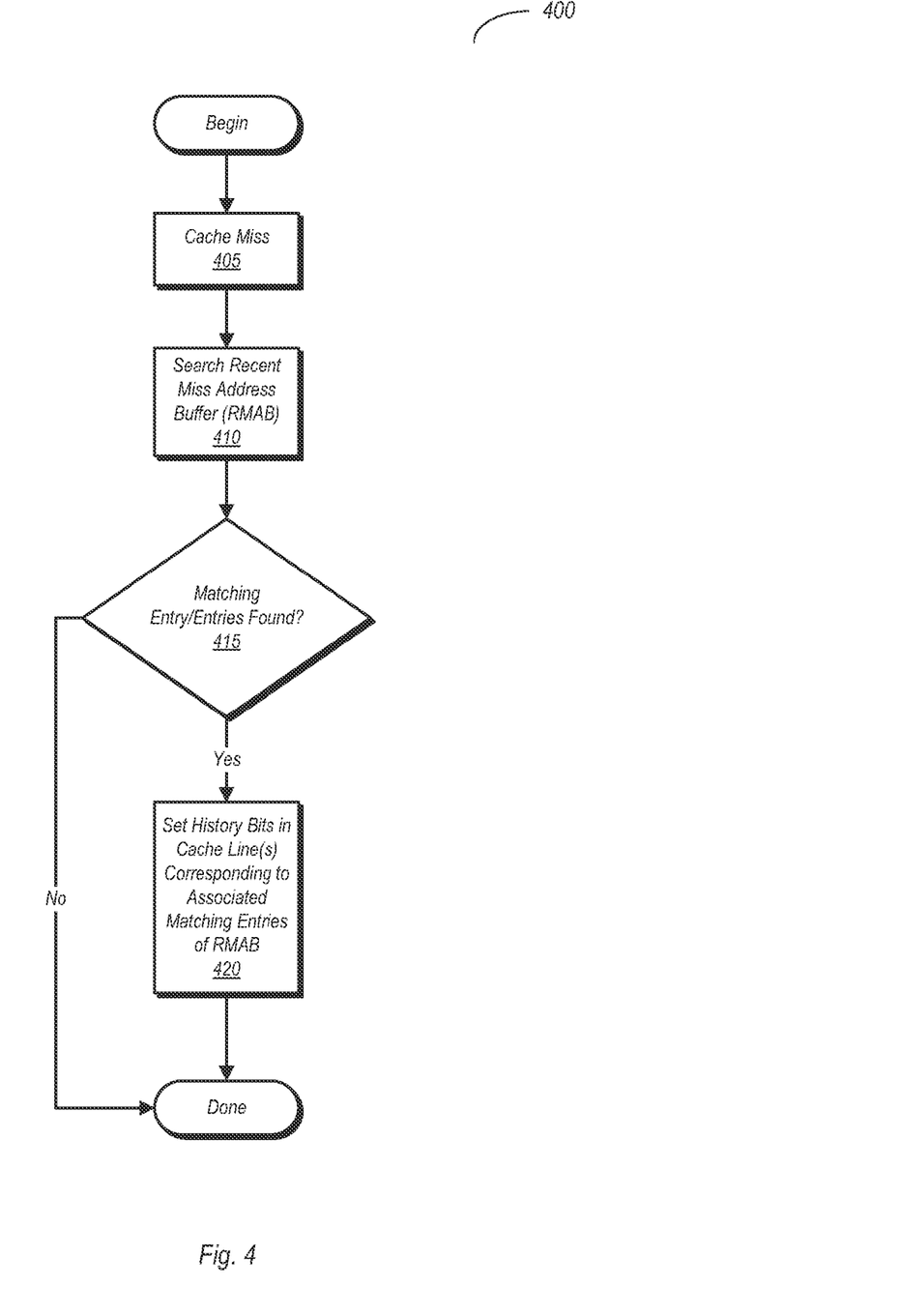
FIG. 4 is a flow diagram illustrating a one embodiment of a method for operating a cache subsystem in determining whether a cache line recently missed.
Figure 5:
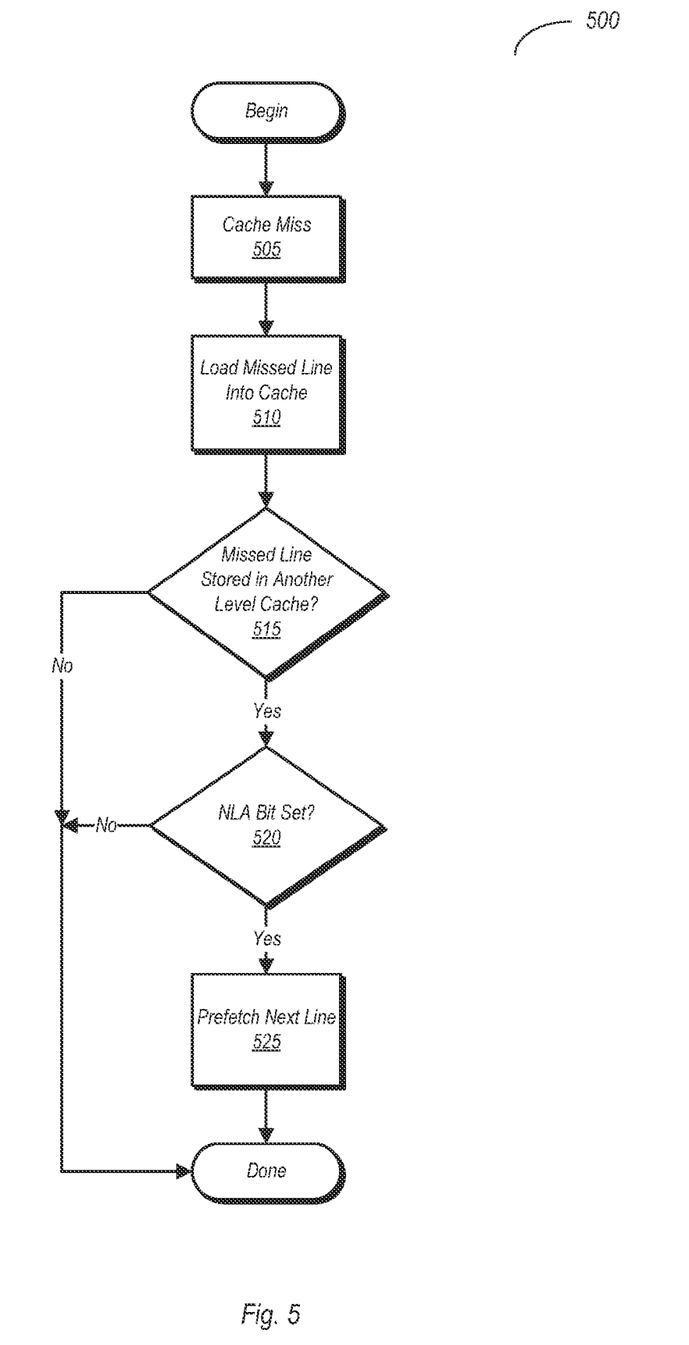
FIG. 5 is a flow diagram illustrating one embodiment of a method for determining whether to prefetch a next cache line based on recent miss history.
Figure 6:
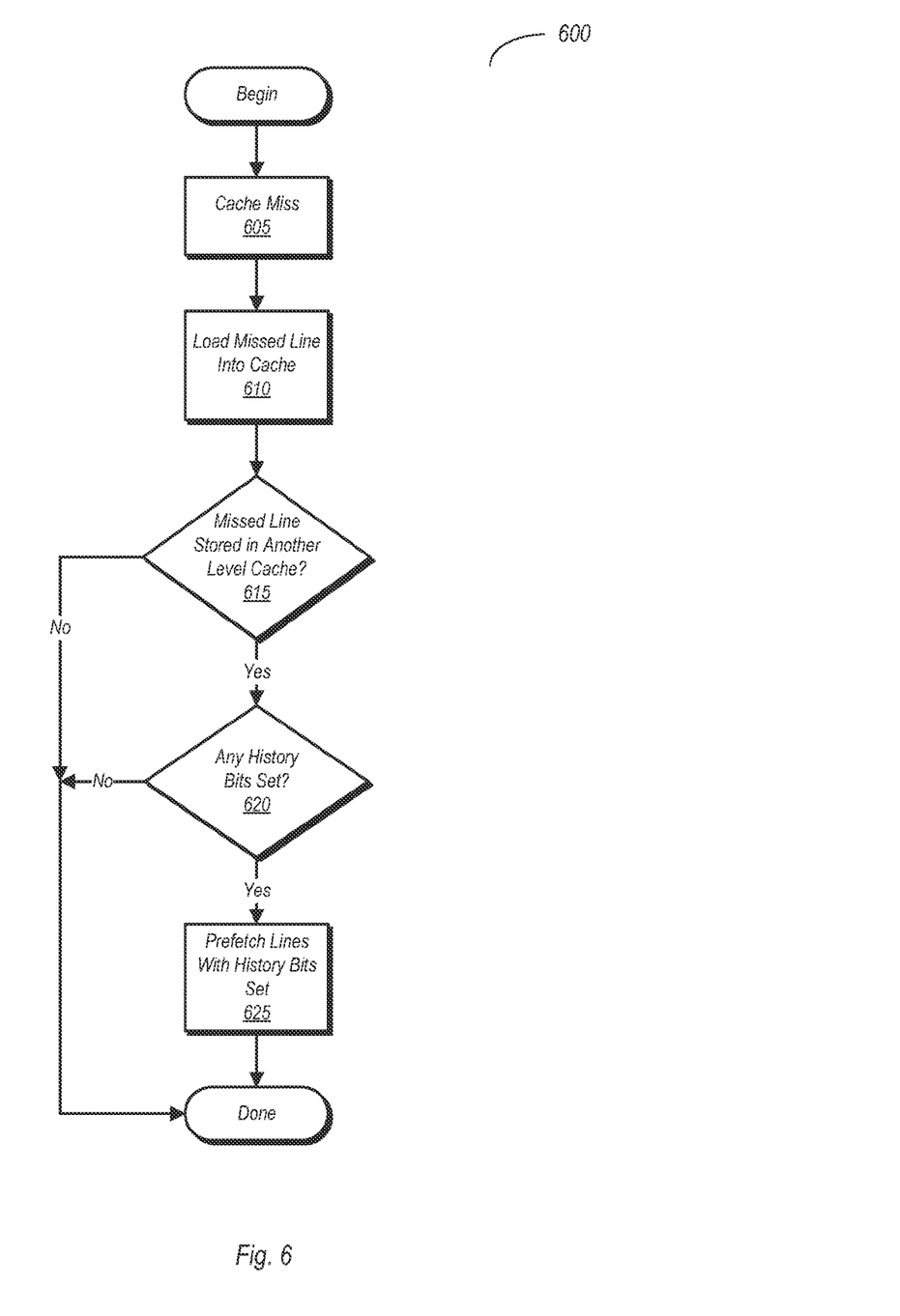
FIG. 6 is a flow diagram illustrating one embodiment of a method for determining whether to prefetch a cache line based on recent miss history.

FIGS. 3-6 are flow diagrams directed to the various methodologies described herein. FIGS. 3 and 5 are directed to embodiments when only a single history bit, the NLA bit, is used to determine if prefetching is performed responsive to a cache miss of a related line. FIGS. 4 and 6 are directed to the more general case wherein multiple history bits may be provided to track miss history for multiple addresses. The method embodiments are discussed within the context of the hardware embodiments described above. However, as previously noted, these method embodiments are not limited to these specific hardware embodiments, and may be implemented using other hardware embodiments that are not described herein. Moreover, as noted above, alternate storage structures for the information stored in the RMAB and the NLA/history bits are possible and contemplated. Accordingly, alternate embodiments of the methods described below that utilize hardware having the alternate storage structures are also considered to fall within the scope of this disclosure.

Turning now to FIG. 3, a flow diagram illustrating one embodiment of a method for operating a cache subsystem in determining whether a next cache line was a recent miss. In the embodiment shown, method 300 begins with a cache miss (block 305). The cache miss may occur at one or more levels of a cache. For example, an execution unit may search for the requested data in an L1 cache, producing a first miss. After missing in the L1 cache, a search for the data may be performed in an L2 cache. If the requested data is not present in the L2 cache, then a second miss occurs.

After missing in at least one cache, a search may be performed in an RMAB (block 310). A matching entry found during the search is an entry in which the address of the current cache miss is the next address relative to the address of an RMAB address. More particularly, a matching entry can be expressed as follows:

(miss address=RMAB entry address+1).

If the condition expressed above is found to be true (block 315, yes), then the NLA bit is set in the cache line associated with the matching entry (block 320). Responsive to a match during the RMAB search, the cache subsystem controller 13 may read the cache set/way information associated with the RMAB entry address to locate the data in the corresponding cache. Upon locating that data in the corresponding cache, the cache subsystem controller may set the NLA bit.

If no matching entry is found, then the method is complete for the cycle, and no NLA bit is set. As noted above, in some embodiments, a time stamp may also be compared, and the NLA bit may or may not be set, even in the case of a match, if a difference between the current time and the time stamp does not exceed a time threshold value. However, it is noted that the time comparison is not required or present in all embodiments.

FIG. 4 is a flow diagram illustrating a one embodiment of a method for operating a cache subsystem in determining whether a cache line recently missed. Method 400 is similar to method 300 described above, beginning with a cache miss (block 405) and a resulting search of an RMAB (block 410). However, the search of an RMAB in method 400 may produce multiple matches. The search of the RMAB may search for addresses such that the current miss address is within a range of consecutive addresses that also includes an address of a given RMAB entry. Consider the example given above wherein N=5, with history bits provided for five consecutive addresses beginning with the next address subsequent to the address of the cached data. In such an embodiment, a match occurs in an RMAB search if the miss address is one of the next five consecutive addresses subsequent to the recent miss address stored in an RMAB entry. In such an embodiment, a search of the RMAB can sometimes produce multiple matches.

If the search of the RMAB results in one or more matches (block 415, yes), then history bits may be set in the cache lines corresponding to the one or more matching entries in the RMAB (block 420). If no matching entries are found, the current cycle of the method is complete with no further action.

FIG. 5 is a flow diagram illustrating one embodiment of a method for determining whether to prefetch a next cache line based on recent miss history. Method 500 begins with a cache miss (block 505) and a load of the missed line into the cache (block 510) responsive to the miss. If the missed line is not stored in another level of cache in this embodiment (block 515, no), then no further checks are made and the method is complete for this cycle. If the missed line is stored in another level cache (block 515, yes), then a check is made to determine if the NLA bit is set (block 520). If the NLA bit is set (block 520, yes), indicating that the next line address was also a prior cache miss, then the next line is prefetched and also loaded into the cache (block 525). If the NLA bit is not set, then no prefetch occurs, and the method is complete for the current cycle.

Method 600 illustrated in FIG. 6 is similar to method 500 of FIG. 5, with the exception that it may be extended to check for multiple addresses in addition to the next line address. Method 600 begins with a cache miss (block 605) and the loading of the missed cache line into the cache (block 610). If the missed line is stored in another (e.g., lower level) cache (block 615, yes) then that cache line is examined to determine if any history bits are set (block 620). If the missed line is not stored in any other cache (block 615, no), then no information regarding the history of associated memory addresses is available in this particular embodiment, and thus the method is complete for that particular cycle. Furthermore, even if the missed line is stored in another cache, but no history bits are set (block 620, no), the method again completes for the cycle. If any history bits are set (block 620, yes), then prefetching of cache lines from the addresses corresponding to the set history bits is performed (block 625).

Numerous variations and modifications will become apparent to those skilled in the art once the above disclosure is fully appreciated. It is intended that the following claims be interpreted to embrace all such variations and modifications.

What is claimed is:
1. An apparatus comprising:
a first cache memory;
a controller circuit configured to:
load data from a first memory address into the first cache memory responsive to a cache miss corresponding to the first memory address;

determine, responsive to the cache miss for the first memory address, if a previous cache miss occurred for a second memory address; and load data from a second address into the first cache responsive to determining that the previous cache miss occurred; and a buffer having a plurality of entries each including an address of a corresponding recent cache miss; wherein responsive to the cache miss, the controller circuit is configured to search the buffer, and further configured to, responsive to locating an entry storing an address in which the first memory address is within N addresses of an address for the first entry, set a bit in a cache line corresponding to that entry if that entry has been allocated for at least a predetermined time;

wherein each of the plurality of entries includes a location in the first cache memory where the data corresponding to the address of that entry is stored, and a time stamp indicating when that entry was allocated to the buffer.

2. The apparatus as recited in claim 1, wherein the second memory address is adjacent to the first memory address in a main memory.

3. The apparatus as recited in claim 1, wherein the second address is within N addresses of the first address in a main memory, wherein N is an integer value of one or more.

4. The apparatus as recited in claim 1, wherein N is an integer value of one or more, and wherein the controller circuit is configured to determine if one of the plurality of entries has been allocated for at least the predetermined amount of time based on the time stamp for that entry.

5. The apparatus as recited in claim 4, wherein the controller circuit is configured to, responsive to the cache miss corresponding to the first address, search the buffer for an entry indicating that the first address is a next address relative to the address for that entry, and further configured to set a bit in a cache line corresponding to that entry if the search of the buffer indicates that the first address is the next address relative to the address for that entry.

6. The apparatus as recited in claim 1, wherein the first cache memory is at a first level, and wherein the apparatus further comprises a second cache at a second level, and wherein the controller circuit is configured to determine, if a previous cache miss occurred at a second line address by determining if an indication bit is set in a cache line of the second cache storing data from the first address.

7. The apparatus as recited in claim 6, wherein each entry in the first cache and each entry of the second cache includes:
a data field;
a memory address indicating where, in a main memory, data in the data field is stored;
a bit indicating, when set, that a previous cache miss occurred at a second line address.

8. A method comprising:
loading, into a first cache, data from a first memory address responsive to a cache miss corresponding to the first memory address;
determining, responsive to the cache miss, if a previous cache miss occurred, the previous cache miss corresponding to a second memory address;
loading, into the first cache, data from the second memory address responsive to determining that the previous cache miss occurred;
searching, in a buffer and responsive to the cache miss, for a first entry indicating that the first memory address is within N addresses of an address for the first entry; and
setting a bit of a cache line stored in the first cache, the cache line corresponding to the address of the first entry, if the first entry has been allocated to the buffer for at least a predetermined amount of time;
wherein the buffer includes a plurality of entries, including the first entry, each of the plurality of entries including an address corresponding to a recent cache miss and further including a location in the first cache where data corresponding to the address of that entry is stored, and wherein N is an integer value of at least one, and wherein of the plurality of entries includes a time stamp indicating a time in which the entry was allocated.

9. The method as recited in claim 8, wherein the second memory address is adjacent to the first memory address.

10. The method as recited in claim 8 wherein the second memory address is within N addresses of the first memory address, wherein N is an integer value of at least one.

11. The method as recited in claim 8, further comprising determining that the first entry has been allocated to the buffer for at least a predetermined amount of time based on the time stamp.

12. The method as recited in claim 11, wherein the first cache is at a first level, and wherein the method further comprises:
setting the bit in a cache line of the first cache corresponding to the first entry; and
setting a bit in a cache line in a second cache at a second level, wherein the cache line in the second cache corresponds to the first entry.

13. The method as recited in claim 8, further comprising setting a bit in a cache line corresponding to the first entry if the search of the buffer indicates that the first memory address is a next address adjacent to the address stored in the first entry.

14. A processor comprising:
a first cache;
a second cache; and
a cache controller, wherein the cache controller is configured to:
load data from a first memory address into the first cache responsive to a cache miss corresponding to the first memory address;
responsive to determining that the data from the first memory address is stored in a cache line of the second cache, determine a bit is set in the cache line of the second cache, the bit indicating that a previous cache miss occurred at a second memory address; and
load data from the second memory address into the first cache responsive to determining that the bit is set in the cache line of the second cache.

15. The processor as recited in claim 14, wherein the second memory address is a next address adjacent to the first address.

16. The processor as recited in claim 14, wherein the second memory address is a previous address adjacent to the first address.

17. The processor as recited in claim 14, wherein the second memory address is within N address of the first address, wherein N is an integer value of at least one.

18. The processor as recited in claim 14, further comprising a buffer having a plurality of entries, wherein each entry includes an address of a recent cache miss, wherein the cache controller is configured to, responsive to the cache miss corresponding to the first memory address, search the buffer for an entry indicating that the first memory address is within N addresses of an address for that entry, and further configured to set a bit in a cache line corresponding to that entry if the search of the buffer indicates that the first memory address is within N address of that entry, wherein N is an integer value of at least one.

\* \* \* \* \*

UNITED STATES PATENT AND TRADEMARK OFFICE
CERTIFICATE OF CORRECTION

PATENT NO. : 9,110,811 B2
APPLICATION NO. : 13/622069
DATED : August 18, 2015
INVENTOR(S) : Yuan C. Chou

Page 1 of 1

It is certified that error appears in the above-identified patent and that said Letters Patent is hereby corrected as shown below:

In the Claims:

Claim 8, col. 10, lines 8-9, please change "wherein of the plurality of entries" to "wherein the plurality of entries".

Signed and Sealed this
Twenty-third Day of August, 2016

Michelle K. Lee
*Director of the United States Patent and Trademark Office*